United States Patent [19]

Smith

[11] 3,928,769

[45] Dec. 23, 1975

[54] LAMINOGRAPHIC INSTRUMENT

[75] Inventor: Webster D. Smith, Lomita, Calif.

[73] Assignee: TRW Inc., Redondo Beach, Calif.

[22] Filed: Mar. 19, 1973

[21] Appl. No.: 342,489

[52] U.S. Cl. .............................. 250/445 T; 250/523
[51] Int. Cl. ........................................... G03b 41/16
[58] Field of Search ........... 250/447, 448, 449, 444, 250/445, 446, 320, 522, 523

[56] References Cited
UNITED STATES PATENTS

| | | |
|---|---|---|
| 2,133,738 | 10/1938 | Chaoul................................ 250/445 |
| 2,720,596 | 10/1955 | Acker.................................. 250/444 |
| 3,091,692 | 5/1963 | Verse................................... 250/445 |

*Primary Examiner*—Archie R. Borchelt
*Assistant Examiner*—C. E. Church
*Attorney, Agent, or Firm*—Daniel T. Anderson; Donald R. Nyhagen; Jerry A. Dinardo

[57] ABSTRACT

A laminographic instrument for radiographically imaging on a radiation sensitive imaging medium, such as a photographic plate or fluorescent screen, a selected cross-section of a specimen. The instrument includes a novel articulated support forming a universal parallel link structure which supports the radiation source, specimen, and imaging medium for relative oscillatory motion such that the imaging medium records a radiographic shadow image of a selected specimen cross-section only. The instrument may have an operating mode in which the imaging medium is held stationary and the specimen oscillates or an operating mode in which the specimen is held stationary and the imaging medium oscillates. When operating in the latter mode with a viewing screen as the imaging medium, the instrument is equipped with a direct viewing system which eliminates image movement at the viewing station.

9 Claims, 5 Drawing Figures

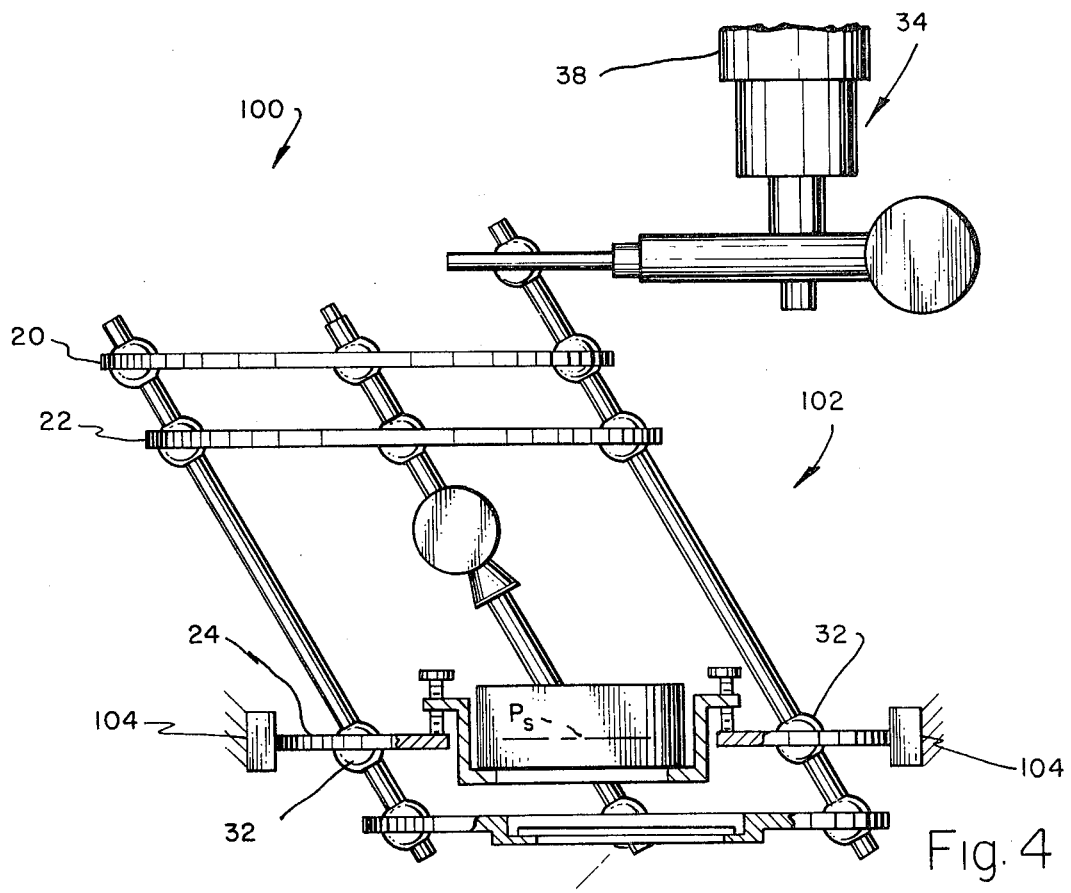
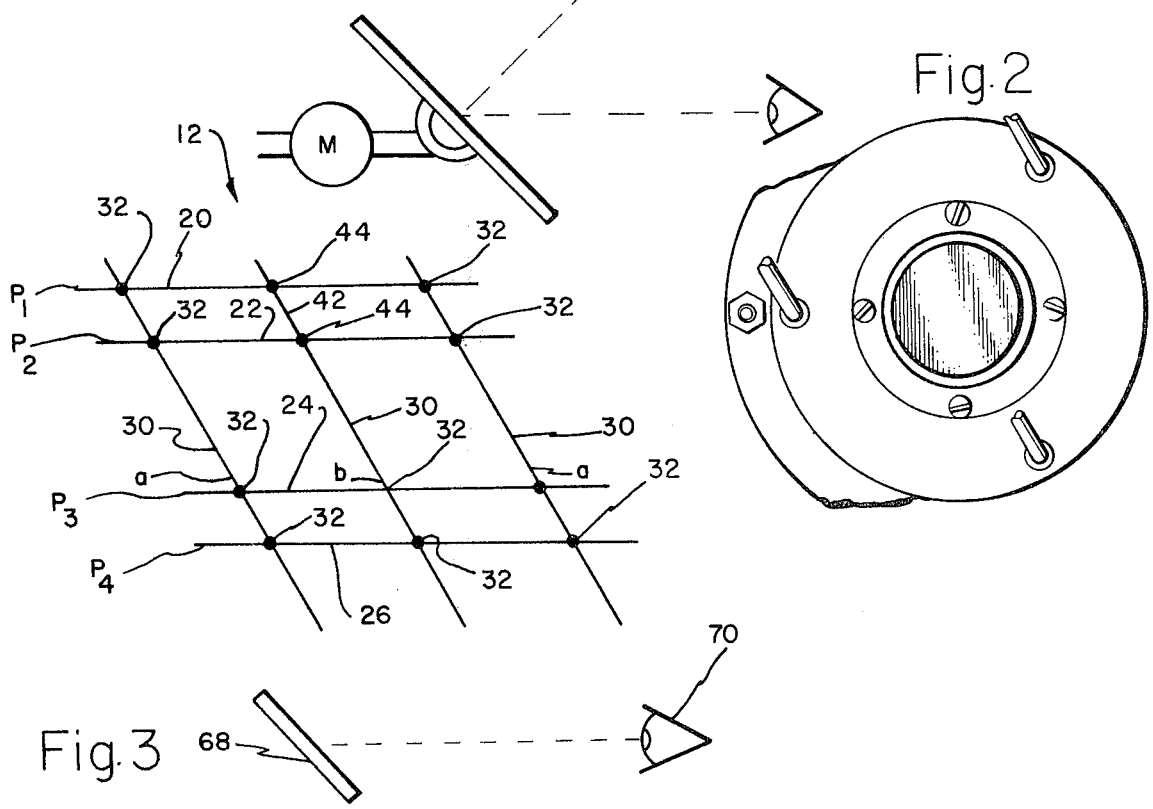

LAMINOGRAPHIC INSTRUMENT

BACKGROUND OF THE INVENTION

1. Field of the Invention

This invention relates generally to the art of laminography and more particularly to an improved laminographic instrument.

2. Prior Art

Laminography, or tomography as it is also called, is the art of radiography as practiced to image only a selected cross-section of the specimen being examined. Briefly, this is accomplished by effecting relative movement of the radiation source, the specimen, and the radiation sensitive imaging medium in a manner such that radiation from the source passing through each point in the plane of the selected specimen cross-section impinges the same point on the radiation sensitive surface of the imaging medium throughout the range of the relative movement. The points of impingement of radiation passing through points in other cross-sectional planes of the specimen undergo continuous relative movement about the surface of the imaging medium. As a consequence, the radiation from the radiation source produces on the surface of the imaging medium a shadow image of the selected specimen cross-section which remains stationary relative to the medium. The shadow images of all other cross-sections of the specimen undergo continuous relative movement with respect to the imaging medium. The imaging medium thus records a distinct shadow image of the selected specimen cross-section only, and the shadow images of all other cross-sections of the specimen are blurred.

A wide variety of laminographic motions and instruments have been devised for practicing the laminographic technique described above. Examplary devices of this type are disclosed in U.S. Pat. Nos. 2,353,145; 2,491,224; 2,720,596; 2,916,627; 2,998,518; 3,082,321; and 3,091,692.

SUMMARY OF THE INVENTION

The present invention provides an improved laminographic instrument of the class described. This instrument has an articulated support including supporting frames disposed one over the other in spaced parallel planes, parallel bars extending transverse to the frame planes at positions spaced about the frames, and swivel connections joining the bars and frames. The articulated support is so constructed and arranged as to form a universal parallel link structure, that is a structure which is movable in any direction parallel to the planes of the support frames. One frame of the support, referred to as a fixed frame, is provided with means for mounting the frame in a fixed position on a supporting structure. When the fixed frame is thus mounted, the support is movable with an oscillatory motion about the swivel connections of the fixed frame in a manner such that the several frames remain parallel to one another, as do the support bars.

Mounted on two frames adjacent one end of the support, by means of two swivel connections whose swivel centers are located on a common axis parallel to the support bars, is a radiation source for emitting a radiation beam along the common axis toward the opposite end of the support. The emitted radiation may be X-rays, gamma rays, or another form of radiation commonly used in the art of laminography. The two frames which support the radiation source are hereinafter referred to as radiator support frames. Adjacent the end of the support remote from the radiator support frames is a third frame, hereinafter referred to as an image frame, for supporting an imaging medium which is sensitive to the radiation from the radiation source. This imaging medium may be either a photographic plate, a fluorescence screen, or the like. Located between the radiator support frames and the image frames is a fourth frame, hereinafter referred to as a specimen frame, for supporting a specimen to be examined.

In operation of the instrument, the articulated instrument support is driven in its oscillatory motion about the swivel connections of the fixed support frame, with a specimen in position on the specimen frame and an imaging medium in position on the image frame. The radiation beam from the radiation source passes through the specimen to the imaging medium. The instrument is so arranged and constructed that the radiation passing through each point of the specimen located in a plane, hereinafter referred to as the focus plane, containing the swivel centers of the specimen frame impinges the same point on the sensitive surface of the imaging medium throughout the range of oscillatory motion of the instrument support. The points of impingement on the surface of radiation passing through points located in other cross-sectional planes of the specimen undergo continuous movement about the sensitive surface of the imaging medium. As a consequence, the imaging medium records a distinct shadow image of only the specimen cross-section located in the focus plane. The shadow images of all other cross-sectional planes of the specimen are blurred on the imaging medium. According to a feature of the invention, the specimen holder or support of the specimen frame is adjustable to locate any selected cross-section of the specimen in the focus plane so as to permit radiographic inspection of any selected cross-section of the specimen.

In some applications of the present laminographic instrument, such as medical applications or industrial applications in which the specimen is relatively large, it is desirable to retain the specimen stationary during operation of the instrument. This is accomplished by mounting the specimen frame in a fixed position. In this case, both the radiation support frames and the image frame undergo oscillatory motion with the instrument support. In other applications, the image frame may be mounted in a fixed position. In this latter case, both the radiator support frames and the specimen frames move in oscillatory motion with the instrument support.

Another aspect of the invention is concerned with direct viewing of the specimen image by using a fluorescent screen as the medium on which the image is produced and providing the instrument with a viewing station from which the image may be viewed directly. In the operating mode of the instrument wherein the image frame is fixed, such direct viewing forms no problem, other than that of shielding the viewer against exposure to the radiation beam of the instrument, since the image produced by the instrument is then stationary. Shielding of the viewer against exposure to the radiation is accomplished by placing a mirror in an appropriate position to reflect the image from the fluorescent viewing screen to a viewing station located out of the path of the radiation beam. Direct viewing of the specimen image in the operating mode of the instrument in which the image frame oscillates with the instrument support, however, does present a problem since the image then undergoes oscillatory motion with the image frame. According to a feature of the invention, the instrument is equipped with a viewing system for reflecting the image from the fluorescent viewing screen to the viewing station in such a way that the image appears stationary, or virtually stationary, as seen from the viewing station.

BRIEF DESCRIPTION OF THE DRAWINGS

In the drawings:

FIG. 2 is a reduced section taken on line 2—2 in FIG. 1;

FIG. 3 is a line diagram of an articulated support embodied in the instrument of FIGS. 1 and 2;

FIG. 4 illustrates a modified instrument; and

DESCRIPTION OF THE PREFERRED EMBODIMENTS

Figure 1:
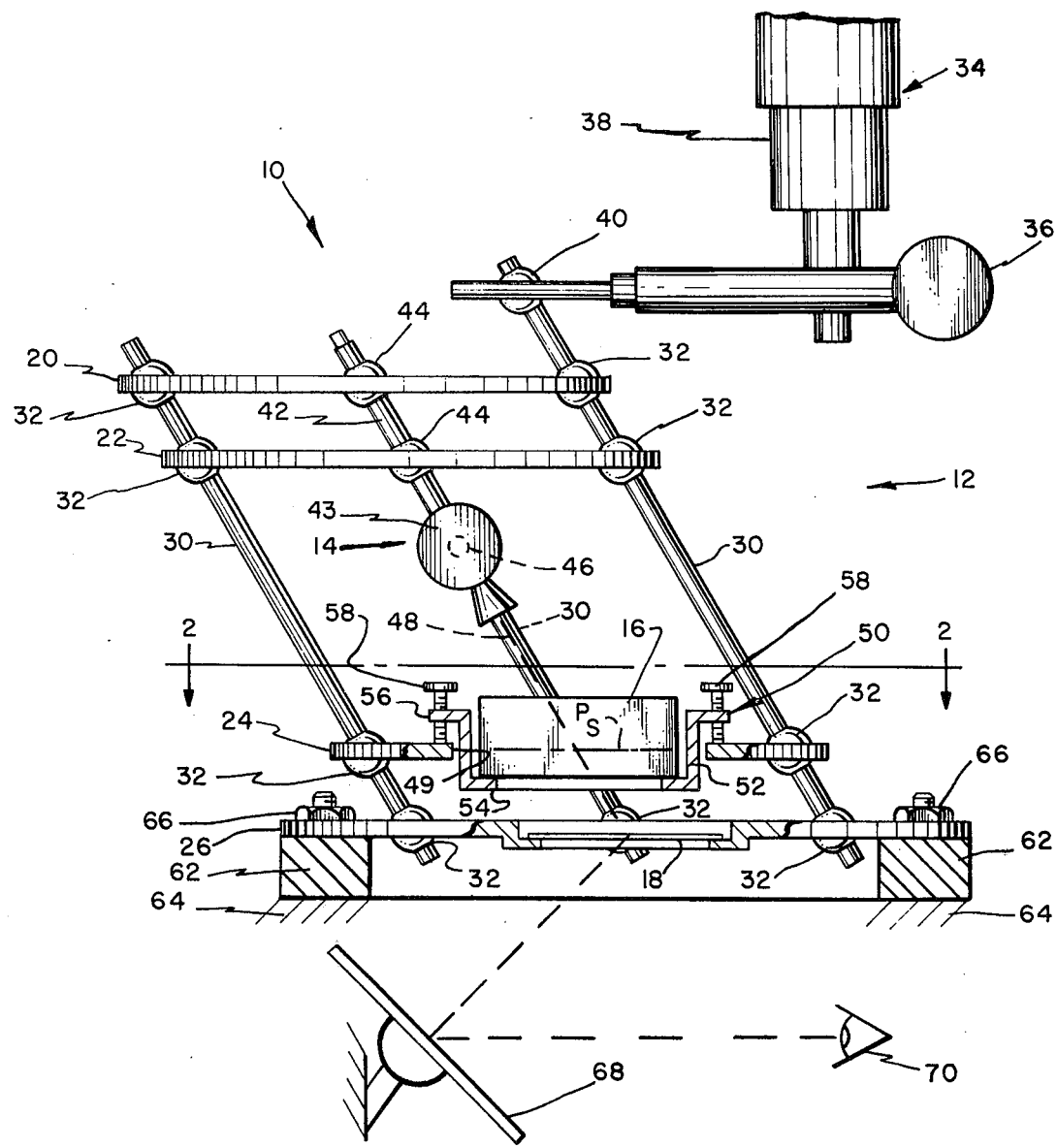
FIG. 1 illustrates a laminographic instrument according to the invention.

Turning now to FIGS. 1, 2, and 3 of these drawings, there is illustrated a laminographic instrument 10 according to the invention. The instrument includes an articulated support 12 for a radiation source 14, a specimen 16 to be examined, and an imaging medium 18. The instrument support 12 has four supporting frames 20, 22, 24, and 26 disposed one over the other in spaced parallel planes $P_1$, $P_2$, $P_3$, and $P_4$. The two frames 20, 22 at the upper end of the support 12 carry the radiation source 14 and are referred to herein as radiator support frames. The next frame 24 supports the specimen 16 to be examined and is referred to herein as a specimen frame. The remaining frame 26 supports the imaging medium 18 and is referred to herein as an image frame. For reasons noted earlier, and hereinafter explained in more detail, the plane $P_3$ of the specimen frame 24 is referred to as an image plane. Spaced about the frames 20, 22, 24, and 26 are three parallel supporting bars 30. The frame and bars are joined by swivel connections 32. It is significant to note here that while the illustrated instrument support 12 has three support bars 30, the support may be equipped with four or more such bars. In the particular embodiment illustrated, the supporting frames 20, 22, 24, and 26 are circular in shape and the three support bars are uniformly spaced 120° apart about the frames.

It will now be understood that each frame 20, 22, 24, and 26 has three swivel connections 32 and each support bar 30 has four swivel connections. Each swivel connection has a swivel center about which occurs the swivel motion of the connection. The swivel centers of the three swivel connections for each frame are located in the plane (i.e. $P_1$, $P_2$, $P_3$, or $P_4$) of the respective frame. The swivel centers of the four swivel connections for each supporting bar are located on a common swivel center axis $a$. The swivel center axes $a$ of the three bars parallel one another. From this description, it is apparent that the support 12 constitutes in effect, a universal parallel link structure wherein anyone of the frames 20, 22, 24, or 26 may be fixed to a stationary supporting structure. The instrument support 12 may then be oscillated about the swivel connections of the fixed frame. The frame planes $P_1$, $P_2$, $P_3$, and $P_4$ remain parallel to one another throughout the range of this oscillatory movement as do the swivel center axes $a$.

The oscillatory movement of the support may be a reciprocating motion, a circular orbital motion, a spiral motion, or a combination of such motions.

Drive means 34 are provided for driving the support 12 in its oscillatory motion. A variety of drive means may be employed for this purpose. The particular drive means illustrated comprises a counterbalanced crank arm 36 driven by a motor 36 and pivotally attached, by a swivel connection 40, to the upper end of one of the support bars 30. Drive means 34 is thus effective to drive the support 12 in an orbital motion about the swivel connections of the fixed frame, as will appear more clearly from the ensuing description.

The radiation source 14 has a holder 42 extending through central openings in the two radiator support frames 20, 22. Holder 42 is attached to these frames by swivel connections 44 whose swivel centers are located on a common axis $b$ parallel to the support bar swivel center axes $a$. Contained in a radiation shielded enclosure 45 on the lower end of the holder 42, as the instrument is viewed in the drawings is a radiation emitter 46. As noted earlier, this radiation emitter may emit X-rays, gamma rays, or any other form of radiation commonly used in laminography. Enclosure 45 has an exit opening through which a radiation beam 48 emanates along the common axis $b$ toward the specimen 16 and the imaging medium 18.

Specimen frame 24 has a large central opening 49 centered on the beam axis $b$. Positioned within this opening is a specimen support or holder 50. This specimen holder comprises a ring having an annular wall 52 with an inwardly directed flange 54 at its lower end and an outwardly directed flange 56 at its upper end. The upper flange 56 projects outwardly over the specimen frame 24. Threaded in this flange are mounting screws 58, the lower ends of which are rotatably secured to the specimen frame 24. From this description, it will be understood the screws 58 are adjustable to adjust the specimen holder in a direction normal to the specimen frame 24. As shown in the drawings, the specimen 16 to be examined is placed in the holder 50 in such a way that the specimen rests on the lower holder flange 54. Any selected cross-section of the specimen may be located in the focus plane $P_3$ of the specimen frame 24 by adjusting the holder mounting screws 58.

The image frame 26 has a large central opening 60 on the beam axis $b$. Surrounding this opening is a flange 62 on the image frame for supporting the imaging medium 18 in the image plane $P_4$ of the image frame. As noted earlier, this imaging medium may be a photographic plate or a fluorescent screen which is sensitive to the radiation from the source 14.

From this description to this point, it will be understood that the radiation beam 48 from the beam source 14 is emitted along the beam axis $b$ and passes through the specimen 16 to the imaging medium 18. When the instrument support 12 is stationary, therefore, the imaging medium receives a shadow image of all points of the specimen 16 which are located within the path of the beam. As will be seen from the ensuing description, oscillatory motion of the support 12 is effective to blur the shadow images produced on the imaging medium 18 of all of the points in the specimen 16 except those lying in the focus plane $P_3$ of the specimen frame 24.

It will be recalled that one of the support frames 20, 22, 24, or 26 is mounted in a fixed position so that the drive means 34 may be operated to drive the support 12 in an oscillatory motion about the swivel connections 32 of the fixed frame. Any one of the frames may be the fixed frame. Normally, however, the fixed frame will be either the specimen frame 24 or the image frame 26. In the embodiment illustrated in FIGS. 1, 2, and 3, the image frame 26 is the fixed frame. To this end, the image frame is equipped with means 62 for mounting the frame in a fixed position on a suitable supporting structure 64. In this instance, the mounting means 62 comprises an annular mounting ring about the image frame 26 which is attached to the supporting structure 64 by means of bolts 66.

In use of the laminographic instrument 10, the drive means 34 is operated to drive the upper end of the articulated support 12 in an oscillatory motion about the swivel connections 32 of the fixed image frame 26. In this instance, the motion of the support is a circular orbital motion. The two radiator support frames 20, 22 and the specimen frame 24 participate in this oscillatory orbital motion in a manner such that the frame planes $P_1$, $P_2$, $P_3$, and $P_4$ remain parallel to one another, as do the several swivel center axes $a$ of the support bars 30 and the radiation beam axis $b$.

It will be understood from the description to this point that the instrument 10 is so constructed and arranged that radiation from the source 14 which passes through each point of the specimen 16 located in the focus plane $P_3$ of the specimen 24 impinges the same point on the imaging medium 18 throughout the range of oscillatory motion of the support 12. Accordingly, the shadow image of the specimen cross-section lying in the focus plane $P_3$ is stationary relative to the imaging medium and the medium photographically records or visually displays a distinct shadow image of this specimen cross-section. The shadow images of all other cross-sections of the specimen 16, at either side of the focus frame $P_3$ undergo continuous relative movement with respect to the imaging medium 18. As a consequence, the latter images are blurred on the imaging medium and the medium produces a distinct image of only the specimen cross-section located in the focus plane. As noted earlier, the specimen holder 50 can be adjusted to locate any selected cross-section of the specimen in the focus plane $P_3$. The above described imaging action obviously occurs regardless of the type of oscillatory motion executed by the instrument support 12. In this regard, it will be recalled that the support may be driven in various oscillatory motions including reciprocating motion, circular orbital motion, or a combination of these motions.

If the imaging medium 18 is a photographic plate, the specimen image produced by the instrument 10 is viewed by photographically developing the plate. The particular imaging medium shown is a fluorescent screen on which the specimen image may be viewed directly from a position below the medium. A mirror 68 is placed below the screen to reflect the image to a viewing station 70 spaced laterally from the radiation beam 48 so as to protect the viewer from the radiation.

Attention is now directed to FIG. 4 illustrating a modified laminographic instrument 100 according to the invention having an articulated support 102. This support is identical to the support 12 of the first described instrument, except for the support frame which is fixed. Thus, the specimen frame 24 of the support 102 is fixed to a supporting structure 104 rather than the image frame 26, as in the earlier embodiment. The drive means 34 is swivelly connected to the upper end of the support 102 in the same manner as described earlier, whereby the support is driven in a circular orbital motion about the connections 32 of the fixed specimen frame 24. In this case, the two radiator support frames 20, 22, and the image frame 26 undergoes orbital motion with the support 102.

From this description, it will be understood that the modified instrument 100 produces on the imaging medium 18, a shadow image of the cross-section of the specimen located in the focus plane $P_S$ which image remains stationary relative to the imaging medium. The shadow images of all cross-sections of the specimen at either side of the focus plane undergo movement relative to the imaging medium. Accordingly, instrument 100, like the earlier described instrument 10, produces a distinct shadow image of only the cross-section of the specimen located in the focus plane. If the imaging medium is a photographic plate, this image will be photographically recorded on the plate and may be viewed by removing and developing the plate, as before. On the other hand, if imaging medium is a fluorescent screen, the specimen image and screen undergo oscillatory motion in unison with the support 102, which motion obviously interfers with viewing of the image with a simple stationary mirror viewing system of the kind embodied in the earlier described instrument 10. Thus, with such a fixed mirror system the specimen image on the fluorescent screen 18, as seen from the viewing station 106, would undergo a circular orbital motion which would render observation of the image difficult if not impossible.

A feature of the instrument 100 resides in a direct viewing system 104 which is effective to eliminate all motion of the oscillating specimen image at the viewing station 106 of the system. It will be evident to those versed in the art that the viewing system may be equipped with a variety of image stabilizing devices for thus eliminating image movement at the viewing station. In the particular embodiment illustrated in FIG. 2, the image stabilizing means comprises a mirror 108 which reflects the specimen image to the viewing station 106. Mirror 108 is driven in a wobble motion in unison with the orbital motion of the viewing screen 18 in such a way that the image appears stationary when viewed in the mirror from the viewing station 106. In this instance, the mirror 108 is driven by a motor 110 having a shaft 112 to which the mirror 108 is attached by an adjustable coupling 116. Mirror 108 is adjusted to an oblique angle relative to the axis of the motor shaft equal to one-half the angle through which a line joining given points on the mirror surface and the viewing screen 18 sweeps during orbital motion of the screen. The mirror is rotated in constant phased relation to the orbital motion of the screen in such a way that each light ray emanating from screen to the mirror and then reflected from the mirror to the viewing station arrives at the station along substantially a fixed path through the range of orbital motion of the screen. Accordingly, the specimen image on the viewing screen appears to be stationary from the viewing station. It will be immediately evident to those versed in the art that the rotation of the mirror 108 may be synchronized in various ways with the orbital motion of the viewing screen 18 to accomplish the described image stabilizing action. For example, the drive motor 38 for the instrument support 102 and the drive motor 110 for the mirror 108 may comprise synchronous a-c motors energized from a common a-c source and suitable reduction gearing for achieving synchronized oscillatory motion of the screen and mirror in the proper phase relation.

Figure 5:
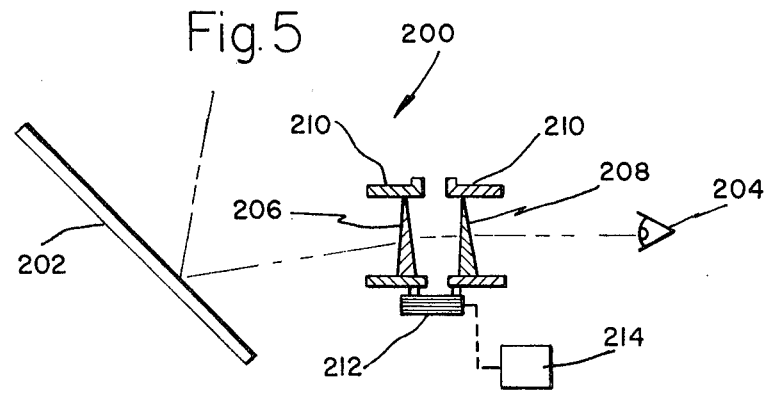
FIG. 5 illustrates another modified instrument.

FIG. 5 illustrates a modified viewing system 200 which may be used in lieu of the viewing system 104. Viewing system 200 has a fixed mirror 202 for reflecting to a viewing station 204 the specimen image on the orbiting viewing screen 18. Positioned between the mirror 202 and the viewing station 204 are a pair of rotary optical wedges 206, 208 for deflecting the light rays reflected from the mirror to the viewing screen. These wedges are mounted in ring gears 210 which mesh with a common pinion 212 coupled to a motor 214. Wedges 206, 208 are driven in constant phased relation to the orbital motion of the viewing screen 18 and have an angle such that each ray emanating from the specimen image on the viewing screen 18 and reflected from the mirror 202 through the wedges to the viewing station 204 arrive at the viewing station along substantially a fixed path throughout the range of orbital motion of the viewing screen. As in FIG. 4, the orbital motion of the viewing screen 18 and the rotation of wedges 206, 208 may be synchronized by using for the drive motor 38 for the instrument support 102 and the drive motor 214 for the optical wedges synchronious motors energized from a common a-c source and equipped with suitable reduction gearing for effecting proper synchronized movement of the viewing screen and optical wedges.

In some applications of the instrument, it may be desirable to adjust the oscillatory or orbital movement of the instrument support. This may be accomplished by adjusting the throw of the crank arm 36 which drives support. A feature of the viewing system 200 resides in the fact that the phase angles of the optical wedges 206, 208 may be adjusted by rotating the wedges in opposite directions equal amounts relative to their ring gears 210 in order to compensate for such crank arm adjustment. If desired, the specimen image may be viewed directly through the optical wedges.

I claim:

1. A laminographic instrument comprising:
    an articulated support including four frames disposed one over the other, connecting bars extending between and spaced about said frames, and swivel connections joining said frames and bars;
    the swivel connections for each frame having their swivel centers located in a common swivel center plane, the swivel connections of each bar having swivel centers located on a common swivel center axis, the swivel center planes of said frames being parallel to one another, and the swivel center axes of the bars being parallel to one another;
    said frames including a pair of radiator support frames adjacent one end of said bars, an image frame adjacent the other end of said bars, and a specimen frame between said support frames and said image frame;
    a radiation source having a radiation axis parallel to swivel center axes;
    a pair of swivel connections joining said source to said radiator support frames and having swivel centers located on said radiation axis;
    said radiation source including means for emitting a beam of radiation along said radiation axis toward said specimen and image frames;
    said specimen frame having means for supporting on said radiation axis a specimen to be examined;
    said image frame including means for supporting on said radiation axis a radiation sensitive imaging medium;
    means for mounting one of said frames in a fixed position, whereby said latter frame is a relatively fixed frame and said support may be driven in an oscillatory motion about the swivel connections of said fixed frame to produce on said imaging medium a shadow image which represents only the cross-section of said specimen located in the swivel center plane of said specimen frame; and
    drive means connected to said support for oscillating said support about the swivel connections of said fixed frame.

2. An instrument according to claim 1 including:
    means for adjusting said specimen to locate any selected cross-section of said specimen in the swivel center plane of said specimen frame.

3. An instrument according to claim 1 wherein:
    one of said specimen and image frames comprises said fixed frame.

4. An instrument according to claim 1 wherein:
    said specimen frame comprises said fixed frame.

5. An instrument according to claim 1 wherein:
    said image frame comprises said fixed frame.

6. An instrument according to claim 1 wherein:
    said specimen frame comprises said fixed frame;
    said imaging medium comprises a fluorescent viewing screen on which is formed a visual shadow image of the specimen cross-section located in the swivel center plane of said specimen frame;
    said specimen image and viewing screen undergo oscillatory motion in unison with said support; and
    said instrument further comprises viewing means for transmitting light rays emanating from said specimen image to a viewing station in a manner such that said image appears to be relatively stationary as seen from said station.

7. An instrument according to claim 6 wherein:
    said viewing means comprises a mirror for reflecting the light rays from such specimen image to said viewing station, and the means for driving said mirror in an oscillatory motion in unison with the oscillatory motion of said viewing screen.

8. An instrument according to claim 6 wherein:
    said viewing means comprises a fixed mirror for reflecting light rays from said specimen image to said viewing station, and optical means for deflecting said light rays between said mirror and said viewing station in synchronism with oscillatory motion of said viewing screen.

9. An instrument according claim 6 wherein:
    said optical means comprises a pair of rotary optical wedges arranged in series between said mirror and said viewing station, and means for driving said wedges in rotation.

* * * * *